Patented Feb. 3, 1942

2,271,724

UNITED STATES PATENT OFFICE 2,271,724

COATED CELLULOSIC SHEET MATERIAL

Waldorf S. Traylor, Newport, Del., assignor to Hercules Powder Company, Wilmington, Del., a corporation of Delaware No Drawing. Application September 30, 1938, Serial No. 232,614

14 Claims. (Cl. 91—70)

This invention relates to an improvement in high gloss, scuff-resistant coating material and to a method for the production thereof.

It has heretofore been realized in the manufacture of a sheet coated with a resinous material, that the application of the resinous material in the form of a hot melt avoided disadvantages inherent in the use of solutions thereof in a volatile solvent. For example, it avoids the cost of solvent recovery and the dangers due to the toxic and inflammable nature of the volatile solvents. The resinous coatings heretofore applied to sheet material have ordinarily been modified with a drying or semi-drying oil to give them satisfactory film strength. Serious difficulties have been encountered in the application of such resins in the molten condition, since they polymerize rapidly and become so viscous that insurmountable difficulties are encountered in their application by coating machines.

Furthermore, such resinous coatings on paper, for example, have a low degree of hardness, or as it is more commonly known in the art, "lack of scuff resistance," which means that the surface is subject to marring even through ordinary handling and processing. This is undesirable not only from the standpoint of appearance but from the standpoint of the protective quality of the film. These resinous coatings also become soft and tacky at slightly elevated temperatures and consequently when wound on a roll, for example, tend to seal themselves to the adjacent surfaces, thus impairing the protective and decorative value of the coatings.

It is an object of this invention to provide a method for the coating of sheet material which avoids the above-mentioned disadvantages and produces a coated sheet which is superior in gloss and scuff-resistance to those heretofore produced.

In accordance with my invention, there is provided a high-gloss, scuff-resistant coated sheet which comprises a base coated with a composition comprising ethyl cellulose and a heat non-convertible resin, said composition having a melting point between about 90° and about 180° C., preferably between about 90° C. and 150° C., and characterized by being substantially heat non-convertible. The aforementioned ethyl cellulose-resin composition may also be modified by the addition of a waxy substance or of a plasticizer or of a combination of both. Suitable pigments may also be incorporated into my compositions in order to obtain various color effects, which may be desirable in many applications.

In making the coating compositions, in accordance with my invention, I may take a resin of the type before mentioned and heat it, with or without the addition of waxy substances and/or plasticizers, to a temperature somewhat less than the decomposition temperature, generally to a temperature of 160° C. to 200° C., but not in excess of about 210° C., and then add to the molten composition, with stirring, ethyl cellulose, until the latter is dissolved in the resinous mixture. The ethyl cellulose is added slowly and continuously in order to insure that each particle is wetted by the molten solution. Agitation is continued for approximately ½ to 2 hours after the ethyl cellulose has been added in order to obtain complete solution. This molten composition, filtered if desired, may then be applied in the molten state or at temperatures where said composition flows, which may be below the melting point of the composition, by suitable means to a cellulose base, such as, for example, paper and carton board stock, or to cloth, or to transparent foils such as Cellophane, cellulose acetate, etc.

The order in which the ingredients are added is not an essential requirement, except that the ethyl cellulose must be dissolved in one or more of the other ingredients. For example, instead of heating the resin and plasticizer or the resin and wax or the resin, wax and plasticizer to the desired temperature and then adding the ethyl cellulose thereto, I may heat, for example, the waxy substance, plasticizer and ethyl cellulose to the desired temperature, stirring until the ethyl cellulose is dispersed and then add this molten mixture to the molten resin, stirring until homogeneity is obtained and then applying the molten composition to a sheet by suitable means. Alternatively, in preparing my coating compositions, I may mill the ingredients together, at elevated temperatures, in suitable equipment such as, for example, a 2 or 3 roll mill and/or a Banbury mixer.

I have found that in order to overcome the disadvantages of prior art compositions, and to make the application of compositions of the type above described, commercially successful, it is necessary to use a heat non-convertible resin. In other words, the resins used should be stable both to gelation phenomena and pyrogenic decomposition and should not show appreciable discoloration at the temperatures used to prepare the composition or used to apply it to the sheet material within the periods of time for which such compositions are normally heated in commercial application. Similar conditions should, of course, also hold for the other ingredients. I have found that any resin which has a cure time of about 100 seconds or more, when in the form of a thin film on a hot plate maintained at about 200° C., is heat non-convertible for use in accordance with this invention.

Among the resins which I have found suitable in accordance with the present invention are the natural resins, such as damar and rosin; heat non-convertible cumarone-indene resins; heat non-convertible polymerized hydrocarbon resins of which polymerized dihydronaphthalene is an example; heat non-convertible phenol-aldehyde type resins of either alkali condensed or acid condensed types produced by the reaction of phenol, cresol, substituted phenols and substituted cresols with an aldehyde such as formaldehyde, acetaldehyde, crotonaldehyde, benzaldehyde, etc., examples of these being an alkali-condensed paraphenylphenol-formaldehyde resin, an alkali-condensed paratertiary amylphenol-formaldehyde resin, an acid condensed para-tertiary butylphenol-formaldehyde resin, and acid condensed meta-and/or para-cresol-acetaldehyde resin, etc.; heat non-convertible rosin-modified polybasic acid-polyhydric alcohol resins, examples of which are the rosin-modified glycerol phthalates, rosin-modified glycerol maleates, rosin-modified terpene-maleic anhydride glycerol resin, etc. Of these resins, I prefer to use the heat non-convertible polymerized hydrocarbon resins, an example of which is polymerized dihydronaphthalene, known to the trade as Du Pont Resin RH 35D and the heat non-convertible rosin-modified polybasic acid-polyhydric alcohol resins before mentioned.

It is preferable, although not necessary, to use resins which are compatible with ethyl cellulose. If an incompatible resin is used it is desirable to have a third component present, for example, a plasticizer, so that the film deposited from the molten composition is homogeneous when cooled.

The plasticizers used in formulating my compositions may for convenience be divided into two classes: plasticizers which have an appreciable effect on the viscosity characteristics of the composition and those having very little or no effect on this characteristic. Among the former are, for example, stearic acid, diphenyl phthalate, triphenyl phosphate, ethyl orthobenzoylbenzoate, etc. These plasticizers have a marked colloiding or solvating influence on the ethyl cellulose and tend to reduce the viscosity of the composition. Among those having little or no effect on the viscosity characteristics are, for example, mineral oils, such as that known as "Nujol," and various vegetable oils such as castor oil, peanut oil, etc.

In general, the quantity of plasticizer used, on the basis of the total formulation, will depend on the type of plasticizer selected. With those plasticizers having a colloiding or solvating effect on the ethyl cellulose, I have found that not substantially in excess of 10% by weight, preferably from about 2% to about 6% by weight, is an optimum amount. With the other type plasticizers, I have found that not substantially in excess of 20% by weight, preferably from about 5% to about 15% by weight, is an optimum amount.

In addition to the plasticizing action produced by the mineral oils and vegetable oils, I have found that the inclusion of these substances in the formulation tends to reduce the relative adhesion of the molten mixture for metal, as compared with paper, for example, which is quite desirable in the machine application of my coatings. Formulations which contain no mineral or vegetable oils have stronger adhesion to metal when molten; consequently, cleaning of the metal mixing kettle and machine application of the composition is somewhat more difficult.

The waxy substances may be incorporated both for the purpose of improving the resistance to water and water vapor and also to serve as tack-breakers. Among the waxy substances which I have found suitable for use in the compositions in accordance with my invention, are the hydrocarbon waxes, such as petroleum waxes, for example, paraffin wax and the mineral waxes, for example ceresin and ozokerite; vegetable waxes, for example, carnauba wax; synthetic waxes, for example, the triglyceride of hydroxystearic acid, known in the trade as "Opalwax;" and wax derivatives, for example, that prepared by reacting montan wax with magnesia. I have found that for most purposes it is not desirable to have more than about 20%, by weight, of a waxy substance present, based on the total formula.

The ethyl cellulose used in my formulations may have an ethoxy content of about 43% to about 55%, and, preferably, of about 46% to about 50% and will have a viscosity from about 1 second to about 8 seconds, preferably from about 2 to about 4 seconds, as measured by noting the time of fall of a $\frac{1}{16}$ inch steel ball in a 25 mm. tube through 10 inches of a solution consisting of 20% by weight of ethyl cellulose dissolved in a solvent mixture composed of 80% by weight of toluol and 20% by weight of ethyl alcohol.

The amount of ethyl cellulose used in formulating my compositions may vary from about 5% to about 40% of the total composition and generally will be from about 20% to about 25% by weight of the total. Ethyl cellulose increases the toughness of the compositions, thereby making them more scuff-resistant as well as less tacky. It furthermore increases the viscosity, thereby decreasing penetration of the composition into the base.

I have found that in certain formulations it is desirable to have a single liquid phase when molten and more than a single phase solid solution at room temperatures. It is also desirable, that in those compositions existing as more than a single phase solid solution at room temperature, that rapid establishment of solubility equilibrium between phases at room temperature occur, in order to obtain greater permanence in the properties of a sheet coated with such compositions. This property is a feature of those formulations containing waxy substances such as paraffin wax, carnauba wax, and magnesia hardened montan wax, and other waxy substances, having a limited solubility in my resinous compositions.

Compositions made in accordance with my invention are permanently thermoplastic and substantially heat non-convertible, in other words they are not converted by heat to insoluble and infusible products. My compositions do not increase in viscosity over a heating period of about 8 hours at a temperature of about 135° C. to about 180° C., which is highly important in the commercial machine application of these coatings. However, neither do they undergo substantial decrease in viscosity during the heating period. In general I have found that the viscosity decrease of my compositions is of the order of 20% or less over a period of 12-16 hours, at an application temperature of about 135° C. to about 180° C.

The sheet material coated with formulations made in the manner shown before may be for example, a fibrous cellulosic sheet, as paper, glassine paper, paper board, etc., a non-fibrous cellulosic sheet as the regenerated cellulose sheet, known in the trade as "Cellophane"; a cellulose derivative sheet, as, for example, cellulose acetate sheet, etc., or the base may be cloth, or it may be metal foil.

In addition to the coating of base materials alone, above shown, I have also found that the overcoating of printed paper stock with my molten compositions offers distinct advantages among which are (1) the prevention of scuffing of the printed design, (2) the production of printed designs having an increased gloss and luster. I have applied my coatings over paper printed with drying oil inks, aniline inks, rotogravure inks, and starch-bound water dispersible inks and in each case have obtained a satisfactory product.

In the claims, it is to be understood that the sheet material which is coated refers to both the material which is unprinted or one which contains a printed design.

As illustrative of the practical embodiment of my invention, the compositions given in the table below have been found to give satisfactory results. Formulae shown are in parts by weight.

Table I

| Ingredients | 1 | 2 | 3 | 4 | 5 | 6 | 7 | 8 |
|---|---|---|---|---|---|---|---|---|
| Ethyl cellulose* (1.1 seconds) | 15.0 | | | | | | | |
| Ethyl cellulose* (2.2 seconds) | | 25.0 | 20.0 | | | 25.0 | 17.3 | 27.0 |
| Ethyl cellulose* (3.8 seconds) | | | | 23.5 | | | | |
| Ethyl cellulose* (6.0–6.8 seconds) | | | | | 8.4 | | | |
| Rosin modified terpene-maleic anhydride-glycerol resin (1) | 85.0 | 55.0 | | 75.0 | | 55.0 | | 65.0 |
| Rosin modified maleate (Amberol 801) | | | | | 75.0 | | 68.2 | |
| Hydrogenated hydrocarbon polymer (duPont—RH35-D) | | | 64.0 | | | | | |
| Mineral oil (Nujol) | | 20.0 | | | | 20.0 | | |
| Castor oil | | | 16.0 | | | | | |
| Triphenyl phosphate | | | | | | | 3.6 | 8.0 |
| Paraffin wax (140° F.) | | | 10.0 | 6.6 | 6.5 | | 10.9 | |
| Triglyceride of hydroxy stearic acid (Opalwax) | | | | 12.4 | 12.4 | | | |
| Magnesia hardened montan wax | | 10.0 | | | | | | |
| Carnauba wax | | 10.0 | | | | | | 20.0 |
| Drop M. P. ° C. (2) | 130 | 133 | 132 | 127 | 127 | 138 | 126 | 135 |

*Ethoxyl content of ethyl cellulose within the range of 46%–48%.
(1) This resin may be prepared by the following procedure: 170 parts by weight of terpene-maleic anhydride and 495 parts by weight of pale wood rosin are heated together, with agitation, to 150° C., using a kettle equipped with a reflux condenser designed to allow volatilization of water and condensation of glycerol. Then 115 parts by weight of glycerol are added and the temperature rapidly raised to 265–270° C., holding it there for about 7 hours or until an acid number of about 9 is reached. The excess glycerol is then removed under vacuum. By carrying out the heating in an atmosphere of carbon dioxide, a paler colored resin may be obtained.
(2) The melting point is determined by the Hercules drop method which is carried out as follows: A small amount of the composition is melted in a beaker and a thermometer graduated from 0° C.–250° C. in 1° divisions, about 13–14 inches long, having about a ⅝ inch long bulb ¼ inch in diameter, inserted through a cork, is dipped into the molten composition and a film of uniform thickness weighing from 0.5 to 0.55 g. is collected and cooled. The thermometer is then placed in a test tube about ⅞ inch in diameter and from 7–8 inches long so that the bulb is about 1 inch from the bottom of the tube, being held in position by the cork which fits the test tube. The test tube is then placed into an 80 cc. beaker filled with 3½ inches of transparent oil so that the bottom of the test tube is approximately one inch from the bottom of the tube. The test is begun with a bath temperature of 90° C. The melting point, perhaps more accurately expressed as the softening point is that temperature as indicated by the thermometer with the sample, at which an elongated drop forms and constricts on the end of the thermometer bulb. If the sample has not melted at 80° C. the temperature of the bath is raised slowly, keeping the latter always 10° C. above the temperature of the sample.

As illustrative of my invention, the compositions shown in Table II have also been found to give satisfactory results. Formulae shown are in parts by weight.

Table II

| | 9 | 10 | 11 |
|---|---|---|---|
| Ethyl cellulose (2.5 sec. 49% ethoxy) percent | | 18.45 | 20 |
| Ethyl cellulose (2.2 sec. 48% ethoxy) percent | 20.46 | | |
| Rosin modified terpene-maleic anhydride-glycerol resin* | 44.44 | 40.4 | 44.0 |
| Triglyceride of hydroxystearic acid (Opalwax) | 4.5 | 5 | |
| Paraffin wax (140° F.) | 4.5 | 9.4 | 8.6 |
| Carnauba wax | 9.87 | 12 | 11.4 |
| Mineral oil ("Nujol") | 16.23 | 14.75 | 16.0 |
| Melting point ° C | 126–128 | 176–178 | 176–174 |
| Machine coating temperatures ° C | 135–140 | 150–160 | 150–160 |

*This resin contains the equivalent of 85% rosin glyceride and 15% terpene-maleic anhydride glyceride.

As illustrative of pigmented compositions, suitable in accordance with my invention, I show the following formulations, the figures being in parts by weight.

Table III

| | | |
|---|---|---|
| Rosin modified terpene maleic anhydride-glycerol resin (1) | 1350 | 1350 |
| Refined mineral oil | 490 | 490 |
| Ethyl cellulose (2.0 seconds) | 673 | 673 |
| Carnauba wax | 490 | 490 |
| Titanium dioxide | 60 | 15 |
| Ultramarine blue | | 1.75 |

The titanium dioxide may be incorporated into the molten composition composed of the other ingredients by first preparing a pigment chip on a two-roll mill, for example, using a 1:1 ratio of pigment to remaining ingredients in the above formulae and then dissolving the chip in the molten composition by agitation in the manner already indicated. The ultramarine blue may be incorporated by first milling the pigment with an equal amount of mineral oil and adding the paste to the molten composition.

It will be understood that other pigments may be incorporated into my compositions depending upon the color effect desired and that the pigments may be incorporated in the manner indicated or in any other convenient manner.

The coating compositions in accordance with this invention are applied without the use of any volatile solvents thus avoiding the cost and fire hazards involved in the use thereof. My compositions furthermore have the advantage over solvent applied coatings in that they do not impregnate to any substantial extent a porous base such as, for example, paper, yet they adhere tightly thereto. My coating composition may be applied in the molten condition to a base as a uniform thin coat at a temperature from about 135°–180° C. and then allowed to solidify by cooling. The coatings may be conveniently applied by the use of the roller coating machines, gravure printing machines, or other paper coating machines which are equipped with suitable means for smoothing the coating agent, thereby producing a smooth coating, as well as with means for maintaining the compositions in the reservoir, above the melting point of said compositions.

It is well known that thermoplastic compositions such as those of the present invention have the property of flowing or leveling out at temperatures below the melting point of the composition. I have found that my compositions instead of being applied in the molten condition may be successfully applied at temperatures where the compositions flow. This temperature may be below the melting point of the composition as determined by the drop melting point. That this can be done is clearly indicated in Table II wherein compositions having a drop melting point in the range of 176°–178° C. may be applied on a coating machine at temperatures within the range of 150°–160° C.

The gloss and scuff resistance values of my compositions, when applied to paper, for example, have been measured in a quantitative manner. Gloss of coated papers is measured on an Ingersoll glarimeter, a standard piece of equipment used extensively by the paper industry. I have found that papers coated with my compositions in the manner indicated above, have a value not less than 50 as determined on this instrument, which is indicative of a high gloss.

The scuff resistance of my coated papers is determined in the following manner: A coated piece of paper is placed on a smooth glass surface, coated side up. It is then fastened securely to the plate by means of masking tape and the gloss of a designated area determined on the Ingersoll glarimeter. This area is then subjected to a uniform scuff which consists of 50 strokes of a 200 mesh copper screen upon which rest 3 kilograms distributed over 16 square inches of screen. The gloss of the scuffed area is again measured, the difference between the two gloss readings being taken as a measure of the scuffing produced. This difference may conveniently be designated as the scuff resistance value. This test is carried out under conditions of 65% relative humidity and a temperature of 70° F. High scuff resistance is indicated when the difference in gloss values is less than 1.0. I have found that papers coated with my compositions, in the manner indicated before, will in general, show a difference in gloss value of less than 1.

The paper on which the coatings were placed for the purpose of these tests is S. D. Warren's clay coated Px high gloss white paper, having a basic weight of 53–56 pounds per 3000 square feet of paper.

It will be understood that this invention is not to be limited to the specific examples because it will be readily apparent to those skilled in the art that many variations and modifications may be made therein without departing from the spirit thereof. The scope of this invention is accordingly to be limited solely by the appended claims.

Where in my claims I have used the expression "fused compositions" it will be understood that I refer to a resolidified composition which has been applied in a molten or fluid phase, as distinguished from a composition which continues to exist in a molten or fluid condition in the finished product.

What I claim and desire to protect by Letters Patent is:

1. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 40% by weight of ethyl cellulose and a substantially heat non-convertible, rosin-modified polybasic acid-polyhydric alcohol resin.

2. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 40% by weight of ethyl cellulose, a plasticizer not in excess of about 20% by weight, and a substantially heat non-convertible, rosin-modified polybasic acid-polyhydric alcohol resin.

3. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 40% by weight of ethyl cellulose, a waxy substance not in excess of about 20% by weight and a substantially heat non-convertible, rosin-modified polybasic acid-polyhydric alcohol resin.

4. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising from about 5% to about 40% by weight of ethyl cellulose, a plasticizer not in excess of about 20% by weight, a waxy substance not in excess of about 20% by weight, and a substantially heat non-convertible, rosin-modified polybasic acid-polyhydric alcohol resin.

5. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 40% by weight of ethyl cellulose, a plasticizer not in excess of about 20% by weight, a waxy substance not in excess of about 20% by weight, and a substantially heat non-convertible, rosin-modified, terpene-maleic anhydride-glycerol resin.

6. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 40% by weight of ethyl cellulose, a mixture of a waxy substance and a mineral oil in an amount not in excess of about 20% by weightt and a substantially heat non-convertible, rosin-modified, terpene-maleic anhydride-glycerol resin.

7. A high gloss, scuff-resistant, non-tacky coated cellulosic sheet material comprising a cellulosic sheet material carrying as a coating applied thereto without substantial impregnation thereof, a fused composition having a melting point within the range of about 90° C. to about 180° C. and comprising from about 5% to about 40% by weight of ethyl cellulose, a plasticizer not in excess of about 20% by weight, a waxy substance not in excess of about 20% by weight and a substantially heat non-convertible, rosin-modified maleic anhydride-glycerol resin.

8. The process of producing a high gloss, scuff-resistant, non-tacky, coated cellulosic sheet material which comprises applying to a cellulosic sheet material without substantial impregnation thereof at a temperature within the range of about 135° C. to about 180° C. a fused composition comprising about 5% to about 40% by weight of ethyl cellulose and a substantially heat non-convertible, rosin-modified polybasic acid-polyhydric alcohol resin, said fused composition having a melting point within the range of about 90° C. to about 180° C., smoothing said fused composition and allowing it to solidify by cooling.

9. The process of producing a high gloss, scuff-resistant, non-tacky, coated cellulosic sheet material which comprises applying to a cellulosic sheet material without substantial impregnation thereof at a temperature within the range of about 135° C. to about 180° C. a fused composition comprising from about 5% to about 40% by weight of ethyl cellulose, a plasticizer not in excess of about 20% by weight and a substantially heat non-convertible, rosin-modified polybasic acid-polyhydric alcohol resin, said fused composition having a melting point within the range of about 90° C. to about 180° C., smoothing said fused composition and allowing it to solidify by cooling.

10. The process of producing a high gloss, scuff-resistant, non-tacky, coated cellulosic sheet material which comprises applying to a cellulosic sheet material without substantial impregnation thereof at a temperature within the range of about 135° C. to about 180° C. a fused composition comprising from about 5% to about 40% by weight of ethyl cellulose, a plasticizer not in excess of about 20% by weight, a waxy substance not in excess of about 20% by weight and a substantially heat non-convertible, rosin-modified polybasic acid-polyhydric alcohol resin, said fused composition having a melting point within the range of about 90° C. to about 187° C., smoothing said fused composition and allowing it to solidify by cooling.

11. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 48% of ethyl cellulose and a substantially heat non-convertible, rosin-modified, terpene-maleic anhydride-glycerol resin.

12. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 40% of ethyl cellulose, a plasticizer not in excess of about 20% by weight, and a substantially heat non-convertible, rosin-modified, terpene-maleic anhydride-glycerol resin.

13. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 40% of ethyl cellulose and a substantially heat non-convertible, rosin-modified, maleic anhydride-glycerol resin.

14. A high gloss, scuff-resistant, non-tacky, coated cellulosic sheet material comprising a cellulosic sheet material carrying as a coating applied thereto without substantial impregnation thereof, a fused composition having a melting point within the range of about 90° C. to about 180° C. and comprising about 5% to about 40% of ethyl cellulose, a mixture of a waxy substance, and a mineral oil in an amount not in excess of about 20% by weight and a substantially heat non-convertible, rosin-modified, maleic anhydride-glycerol resin.

WALDORF S. TRAYLOR.

CERTIFICATE OF CORRECTION.

Patent No. 2,271,724. February 3, 1942.

WALDORF S. TRAYLOR.

It is hereby certified that error appears in the printed specification of the above numbered patent requiring correction as follows: Page 5, first column, line 36, claim 10, for "187° C." read --180° C.--; and second column, line 4, claim 11, for "48¢" read --40¢--; and that the said Letters Patent should be read with this correction therein that the same may conform to the record of the case in the Patent Office.

Signed and sealed this 24th day of March, A. D. 1942.

(Seal)
Henry Van Arsdale,
Acting Commissioner of Patents.